(12) United States Patent
Kai et al.

(10) Patent No.: US 9,010,648 B2
(45) Date of Patent: Apr. 21, 2015

(54) ANTENNA AND RFID TAG

(71) Applicant: Fujitsu Limited, Kawasaki-shi, Kanagawa (JP)

(72) Inventors: Manabu Kai, Yokohama (JP); Teruhisa Ninomiya, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 26 days.

(21) Appl. No.: 13/895,622

(22) Filed: May 16, 2013

(65) Prior Publication Data

US 2013/0341411 A1    Dec. 26, 2013

(30) Foreign Application Priority Data

Jun. 22, 2012  (JP) .................................. 2012-140989

(51) Int. Cl.
| | | |
|---|---|---|
| G06K 19/06 | (2006.01) | |
| G06K 19/077 | (2006.01) | |
| H01Q 1/22 | (2006.01) | |
| H01Q 1/38 | (2006.01) | |
| H01Q 7/00 | (2006.01) | |

(52) U.S. Cl.
CPC ........ *G06K 19/07783* (2013.01); *H01Q 1/2225* (2013.01); *H01Q 1/38* (2013.01); *H01Q 7/00* (2013.01)

(58) Field of Classification Search
CPC .......... G06K 19/077; G06K 19/07749; G06K 19/0723; G06Q 20/341; H01Q 21/29
USPC .................................................. 235/487, 492
See application file for complete search history.

(56) References Cited

U.S. PATENT DOCUMENTS

| | | | |
|---|---|---|---|
| 7,667,658 B2 | 2/2010 | Kai et al. | |
| 7,876,227 B2* | 1/2011 | Bellows | 340/572.7 |
| 8,508,342 B2* | 8/2013 | Deguchi et al. | 340/10.1 |
| 2009/0295567 A1* | 12/2009 | Bellows | 340/539.11 |
| 2011/0115607 A1* | 5/2011 | Deguchi et al. | 340/10.1 |

FOREIGN PATENT DOCUMENTS

| | | |
|---|---|---|
| EP | 1538560 | 6/2005 |
| EP | 1598815 | 11/2005 |
| EP | 2133827 | 12/2009 |
| JP | 2005-347798 | 12/2005 |
| WO | WO-2006/077645 | 7/2006 |
| WO | 2009146272 | 12/2009 |

OTHER PUBLICATIONS

Extended European Search Report dated Aug. 8, 2013, issued in corresponding European Patent Application No. 13167976.3.

* cited by examiner

*Primary Examiner* — Paultep Savusdiphol
(74) *Attorney, Agent, or Firm* — Fujitsu Patent Center

(57) ABSTRACT

An antenna includes a first loop, a second loop which encloses an outer side of the first loop and is separated from the first loop by a slit and both end of which are merged with both ends of the first loop, and IC chip connection parts provided in a portion where the first loop and the second loop are merged, wherein a loop length of the first loop and a loop length of the second loop are equal to or shorter than one third of a wavelength corresponding to a desired frequency resonant with an IC chip connected to the IC chip connection parts.

5 Claims, 12 Drawing Sheets

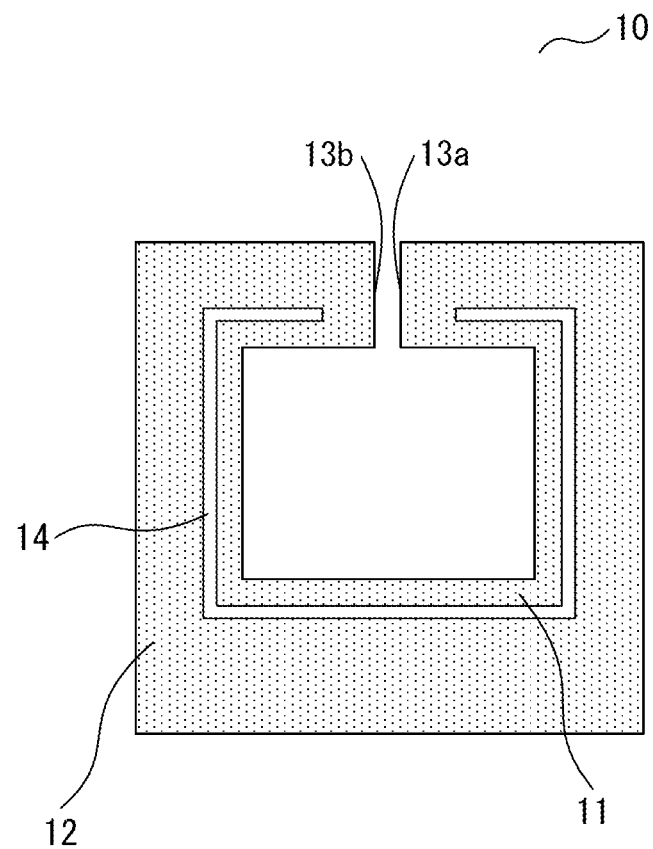
F I G. 1

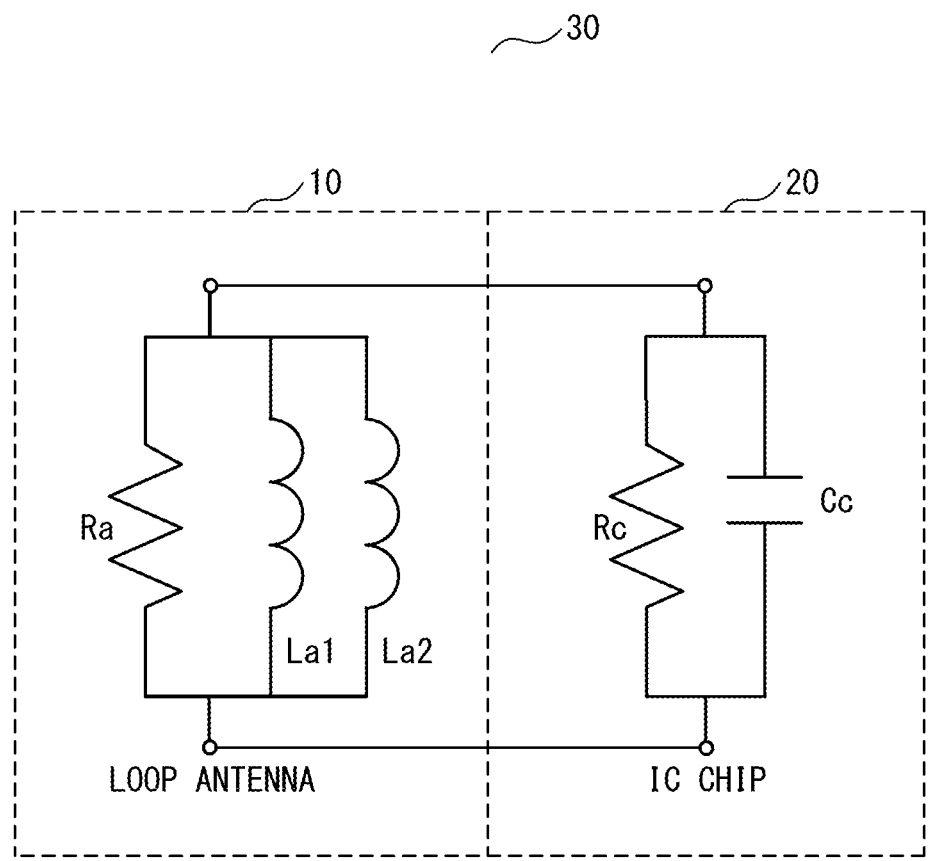
F I G. 2

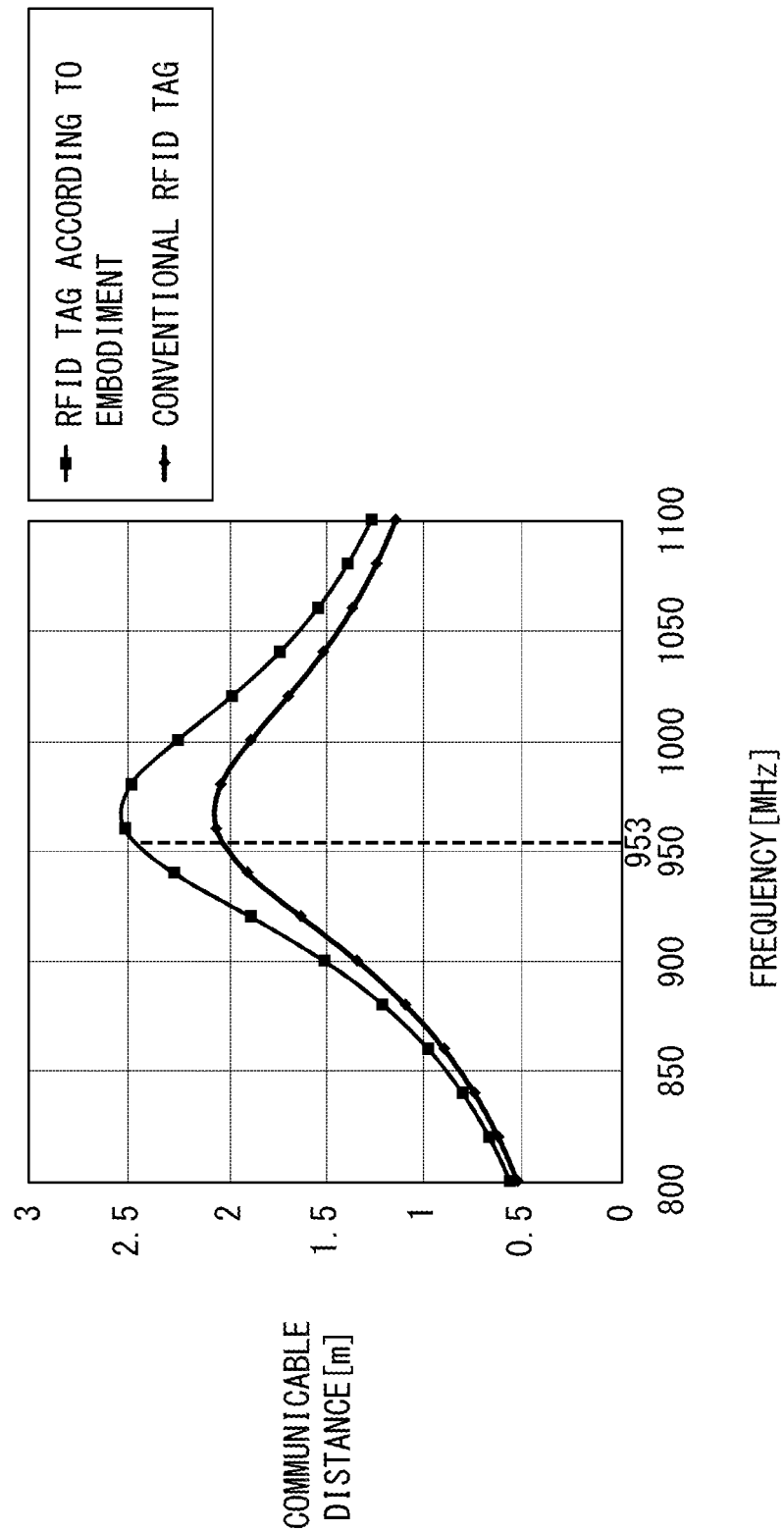
F I G. 5

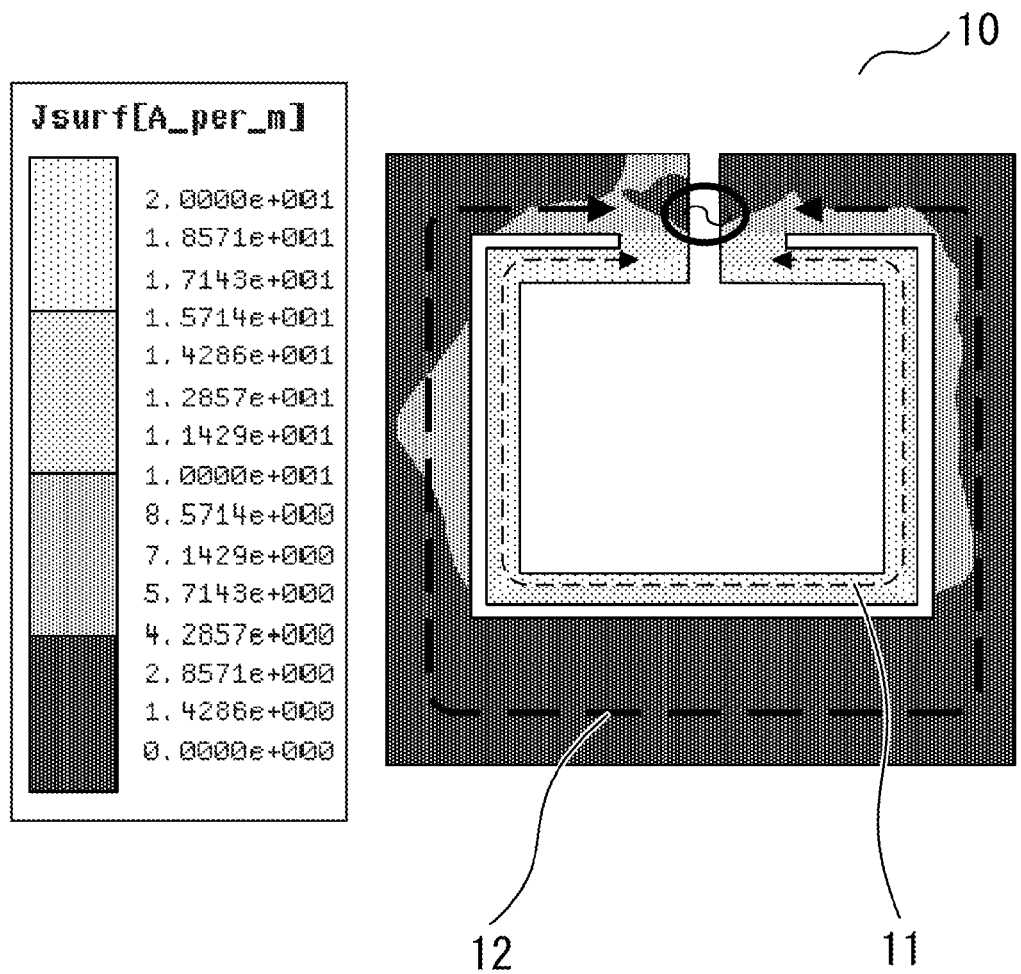
F I G. 6

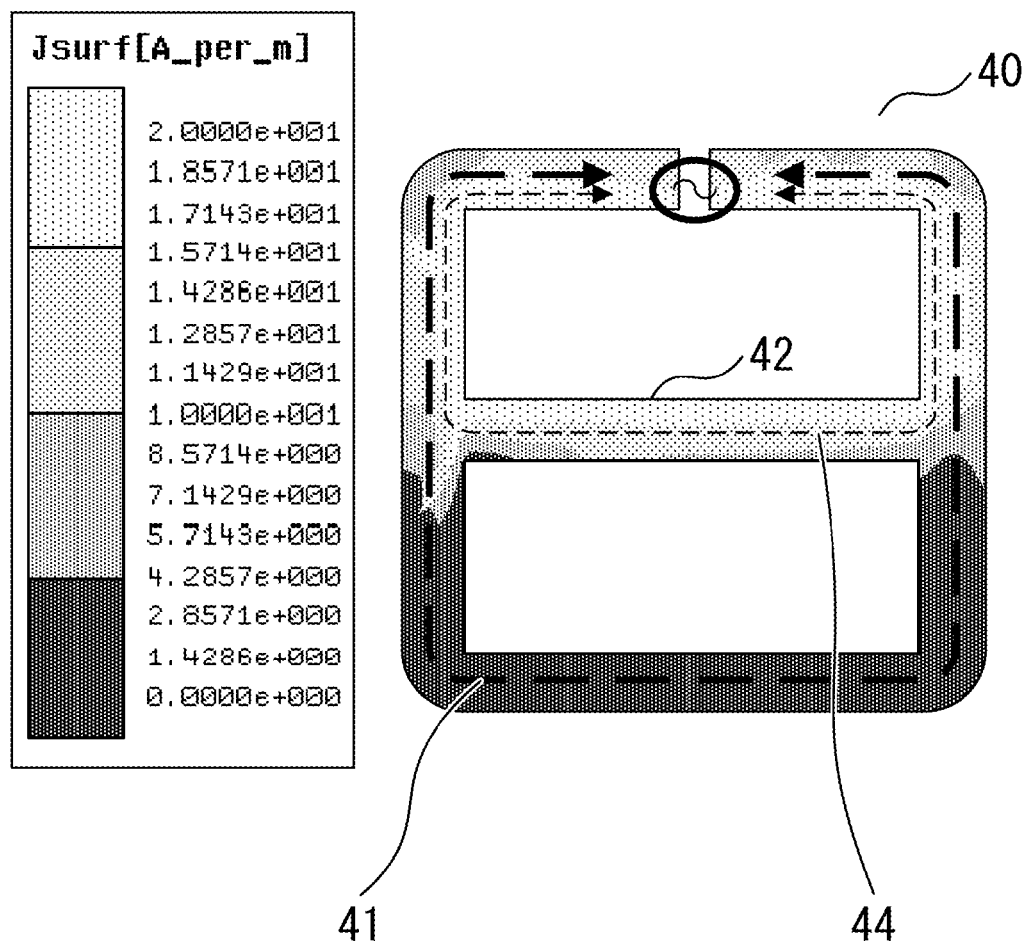
F I G. 7

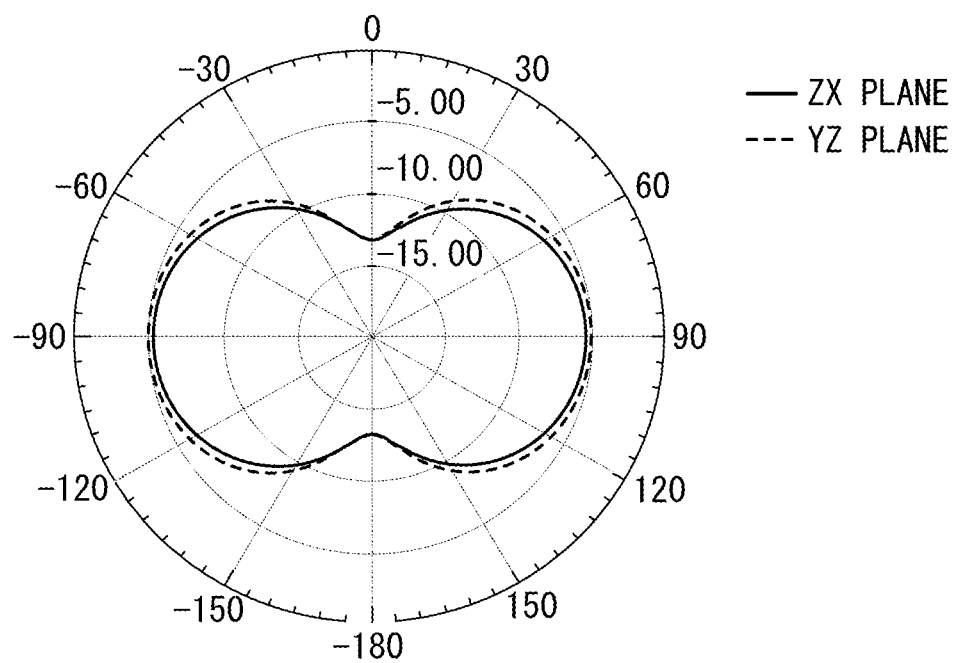
F I G. 8

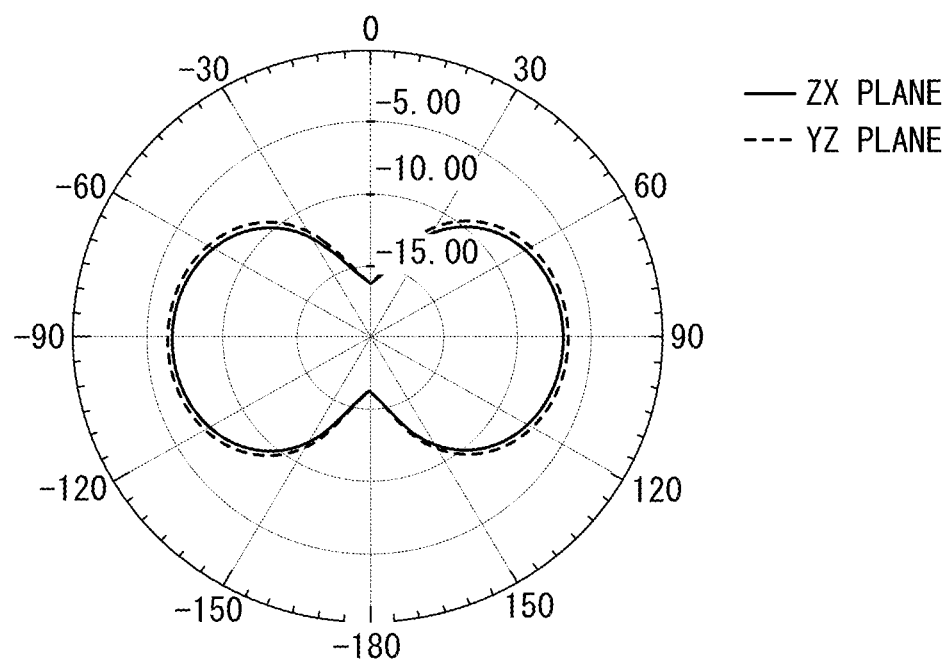
F I G. 9

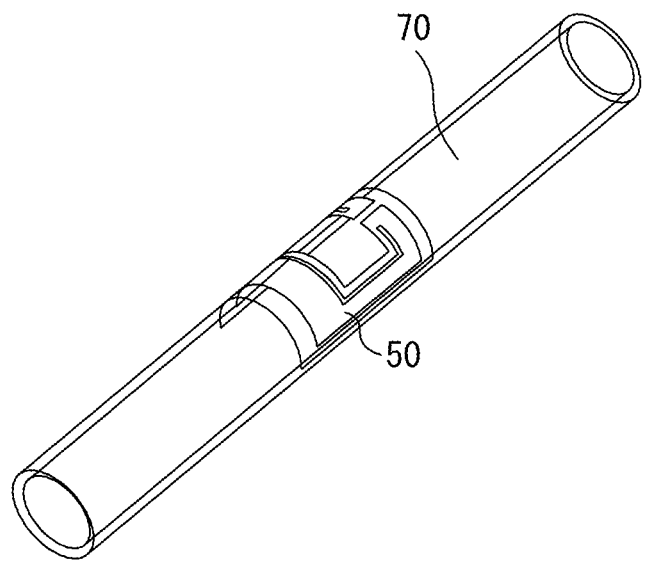
F I G. 1 1

ANTENNA AND RFID TAG

CROSS-REFERENCE TO RELATED APPLICATION

This application is based upon and claims the benefit of priority of the prior Japanese Patent Application No. 2012-140989, filed on Jun. 22, 2012, the entire contents of which are incorporated herein by reference.

FIELD

The embodiments discussed herein are related to an antenna and a radio frequency identification (RFID) tag.

BACKGROUND

In recent years, a technique called RFID for identifying and managing individuals has been studied and developed. In RFID, a medium called an RFID tag includes an integrated circuit (IC) chip such as a large scale integration (LSI) chip or the like, and an antenna. The RFID tag has a function of transmitting and receiving information, such as identification data of an individual or the like, recorded on the IC chip with the antenna via an electromagnetic wave. The information recorded on the IC chip of the RFID tag is read and written by a device called a reader/writer via an electromagnetic wave.

Types of the above described RFID tag are broadly classified into a passive type and an active type depending on a difference of a power supply method.

A passive-type RFID tag has advantages such that the tag can be manufactured with less cost than an active-type RFID tag that internally includes a battery, and does not need to be maintained by taking the lifetime of the battery into account. However, since the passive-type RFID tag does not include a battery that supplies operating power, power demanded to drive the IC chip needs to be transmitted from the reader/writer to the RFID tag simultaneously with a communication. Accordingly, a communicable distance between the reader/writer and the passive-type RFID tag can be decided according to a distance in which power can be transmitted from the reader/writer to the passive-type RFID tag.

As described above, in RFID using the passive-type RFID tag, a frequency band available to a carrier wave is regulated by law or the like since an output of transmitting power is needed for the carrier wave. For example, with regulations laid down by the Radio Act of Japan, a transmission output of an ultra-high frequency (UHF) band such as an 860 to 960 MHz band is higher than that of a high frequency (HF) band such as a 13.56 MHz band. Accordingly, in application fields, such as billing, a prepaid function, and security management, which are desired to limit a communicable distance among application fields of the RFID tag, the HF band can be used because the transmission output may be small. In the meantime, in application fields, such as management of goods, logistics or the like, which are desired to extend a communicable distance, the UHF band can be used because a transmission output is enabled to be increased.

In addition, the RFID tag needs to be designed to fit a size of a target object to which the RFID tag is attached.

For example, if the target object to which the RFID tag is attached is small, also the RFIG tag needs to be downsized according to the size of the target object to which the RFID tag is attached. Especially, since an antenna occupies most of a mounting area of the RFID tag, the antenna needs to be downsized.

However, if the antenna mounted within the RFID tag is downsized, a length of the antenna becomes shorter than a wavelength corresponding to a desired frequency, and a radiation efficiency of the antenna can be possibly decreased. Therefore, a communicable distance between the reader/writer and the RFID tag can be possibly shortened.

Incidentally, there is a conventional technique for configuring an RFID tag antenna by including a power feeding terminal to which an LSI chip for an RFID tag is connected, a loop antenna connected to the power feeding terminal, and a bypass conducting path for bypassing a loop of the loop antenna.

There is also a conventional technique for improving a VSWR characteristic within a needed bandwidth by using a loop antenna having a short-circuit wire for shot-circuiting two points of the loop antenna at a position other than power feeding points provided on the sides of both ends of an antenna conductor that configures the loop antenna in comparison with a multiple-loop antenna where a plurality of loop antennas having different resonant frequencies within the needed bandwidth are connected in parallel.

PRIOR ART DOCUMENTS

Patent Documents

[Patent Document 1] International Publication Pamphlet No. 2006/077645
[Patent Document 2] Japanese Laid-open Patent Publication No. 2005-347798

SUMMARY

According to an aspect of the embodiments, an antenna includes a first loop, a second loop which encloses an outer side of the first loop and is separated from the first loop by a slit and both end of which are merged with both ends of the first loop, and IC chip connection parts provided in a portion where the first loop and the second loop are merged, wherein a loop length of the first loop and a loop length of the second loop are equal to or shorter than one third of a wavelength corresponding to a desired frequency resonant with an IC chip connected to the IC chip connection parts.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 schematically illustrates a configuration of a loop antenna according to a first embodiment;

FIG. 2 is a diagram of an equivalent circuit of the loop antenna according to the embodiment;

FIG. 5 illustrates frequency characteristics relative to communicable distances of an RFID tag including the loop antenna according to the first embodiment and an RFID tag including the conventional antenna;

FIG. 6 illustrates a current density distribution of the RFID tag including the loop antenna according to the first embodiment;

FIG. 7 illustrates a current density distribution of the RFID tag including the conventional antenna;

FIG. 8 illustrates an antenna directivity of the RFID tag including the loop antenna according to the first embodiment;

FIG. 9 illustrates an antenna directivity of the RFID tag including the conventional antenna;

FIG. 11 is an explanatory diagram of a usage example of the RFID tag according to the embodiment.

BRIEF DESCRIPTION OF EMBODIMENTS

First Embodiment

Figure 3:
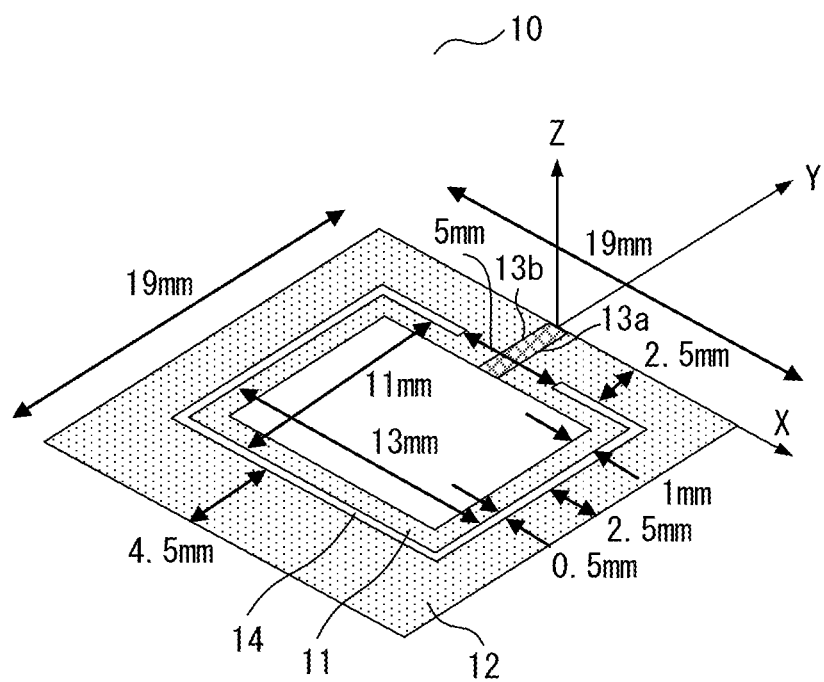
FIG. 3 illustrates one example of a size of the loop antenna according to the first embodiment.

Embodiments are described in detail below with reference to the drawings.

FIG. 1 schematically illustrates a configuration of a loop antenna according to a first embodiment.

As illustrated in FIG. 1, the loop antenna 10 according to the first embodiment includes a first loop 11, a second loop 12, IC chip connection parts 13a and 13b, and a slit 14.

The first loop 11 is a loop portion on an inner side in the loop antenna 10, whereas the second loop 12 is a loop portion on an outer side in the loop antenna 10. The first loop 11 is present on an inner side of the second loop 12, and the second loop 12 encloses the outer side of the first loop 11. With the first loop 11 and the second loop 12, the loop antenna 10 is configured as a double-loop antenna.

The first loop 11 and the second loop 12 are separated by the slit 14, and merged at the IC chip connection parts 13a and 13b which are positioned at ends of the first loop 11 and the second loop 12. Namely, the first loop 11 and the second loop 12 are connected in parallel when viewed from the IC chip connection parts 13a and 13b.

The IC chip connection parts 13a and 13b are portions of the loop antenna 10, to which a terminal of an IC chip mounted on the RFID tag is connected.

The slit 14 is a portion of the loop antenna 10, which is present in a gap between the first loop 11 and the second loop 12, and is a portion that separates the first loop 11 and the second loop 12.

In the first embodiment, the first loop 11 and the second loop 12 within the loop antenna 10 take the shape of a quadrangle such as a square or a rectangle except for the IC chip connection parts 13a and 13b which are separately present.

Assuming that a desired frequency is 953 MHz, a length of a side of the second loop 12 that takes the shape of the quadrangle can be 19 mm except for a side on which the IC chip connection parts 13a and 13b are present. Accordingly, the size of the entire RFID tag according to the first embodiment, which includes the loop antenna 10 and the IC chip mounted in the loop antenna 10, can be 19 mm×19 mm.

In addition, loop lengths of the first loop 11 and the second loop 12 can be equal to or shorter than 76 mm (19 mm×4), and can be approximately one fourth (approximately $0.24\lambda$) of 315 mm which is a wavelength $\lambda$ corresponding to the desired frequency 953 MHz, namely, can be equal to or shorter than one third of 315 mm. That is, the first loop 11 and the second loop 12 within the loop antenna 10 according to the embodiment are very small loops having a loop length that is sufficiently shorter than a wavelength corresponding to a desired frequency. Accordingly, the first loop 11 and the second loop 12 function as an inductor.

In addition, the loop length of the second loop 12 is longer than the loop length of the first loop 11. Accordingly, assuming that the inductors of the first loop 11 and the second loop 12 are respectively La1 and La2, the value of the inductor La2 is larger than the value of the inductor La1, so that a relational expression La2>La1 is satisfied.

FIG. 2 is a diagram of an equivalent circuit of the RFID tag according to the embodiment.

As illustrated in the diagram of the equivalent circuit of an RFID tag 30 according to the embodiment illustrated in FIG. 2, the loop antenna 10 according to the first embodiment can be equivalently represented with a circuit where a resistor Ra, the inductor La1 and the inductor La2 are connected in parallel. Moreover, an IC chip 20 mounted on the RFID tag 30 according to the embodiment by being connected to the IC chip connection parts 13a and 13b can be equivalently represented with a circuit where a resistor Rc and a capacitor Cc are connected in parallel.

As described above, the equivalent circuit of the RFID tag according to the embodiment is represented as a parallel resonant circuit. Therefore, a resonant condition of the RFID tag according to the embodiment is that an imaginary component of an admittance Y of the equivalent circuit illustrated in FIG. 2 is zeroed (0), namely, that the following equation (1) is satisfied.

$$j\left\{\omega C_c - \left(\frac{1}{\omega L_{a1}} + \frac{1}{\omega L_{a2}}\right)\right\} = 0 \qquad (1)$$

Here, $\omega$ in the equation (1) is an angular frequency of an electromagnetic wave received by the loop antenna 10, and a relational expression $\omega=2\pi f$ is satisfied if the frequency is assumed to be f.

Assume that the value of the resistor Rc and the value of the capacitor Cc are set to 2000Ω and 1.0 pF respectively in the IC chip 20. Also assume that the value of the resistor Ra, the value of the inductor La1, and the value of the inductor La2 are set to 20000 Ω, 35 nH, and 140 nH respectively in the loop antenna 10. If the values are set as described above, a combined inductance of the inductor La1 and the inductor La2 is 28 nH, which satisfies the resonant condition with the capacitor Cc of 1.0 pF at a frequency 953 MHz.

As described above, the value of the inductor La2 is larger than the value of the inductor La1, so that the relational expression La2>La1 is satisfied. Accordingly, the resonant condition represented with the expression (1) can be mainly decided according to the value of the inductor La1. Therefore, the first loop 11 can function as a portion for matching with the IC chip 20 within the loop antenna 10.

In addition, the loop antenna has a characteristic such that the radiation efficiency η of the loop antenna is highest when a loop length of one circle of the loop antenna is equal to one wavelength $\lambda$ corresponding to a desired frequency, and the radiation efficiency η decreases to reduce the antenna gain when the length of one circle of the loop antenna becomes shorter than one wavelength $\lambda$. As illustrated in FIG. 1, the loop length of the second loop antenna 12 is longer than the loop length of the first loop 11 in the loop antenna 10 according to the first embodiment. Accordingly, the radiation efficiency of the second loop antenna 12 is higher than the radiation efficiency of the first loop 11, and the antenna gain is higher. Therefore, the second loop 12 can function as a portion for increasing the antenna gain within the loop antenna 10.

With such functions of the first loop 11 and the second loop 12, the shape and the size of the first loop 11 are decided to have an inductance that is resonant with the value of the capacitor Cc of the IC chip to be mounted. For example, the loop length of the first loop 11 is decided to satisfy the resonant condition represented with the above described equation (1).

In contrast, the shape and the size of the second loop 12 are decided to increase the antenna gain. For example, to improve the radiation efficiency η of the antenna, the loop length of one circle of the second loop 12 can be increased as long as possible within a scope of constraints placed by a size of a target object to which the RFIC tag is attached. Moreover, to improve the radiation efficiency η of the antenna by reducing a conductor loss, a wire width of the second loop 12 can be increased as thick as possible within the scope of constraints.

The sizes of the first loop 11 and the second loop 12 are set, for example, in the following steps described below reference to FIG. 3.

FIG. 3 illustrates one example of the size of the loop antenna according to the first embodiment.

Assume that the desired frequency is 953 MHz. Also assume that the size demanded for the loop antenna 10 is 19 mm×19 mm. Further assume that variations that can occur when the loop antenna 10 is manufactured are ±0.1 mm. Still further assume that an interval between the IC chip connection parts 13a and 13b is 1 mm by taking the size of the IC chip 20 connected to the loop antenna 10 into account.

Based on the above described assumptions, the length of each of the sides of the second loop 12 is set to 19 mm except for the side on which the IC chip connection parts 13a and 13b are set, as illustrated in FIG. 3. Namely, among wire portions of the second loop 12, which respectively correspond to the sides of the second loop 12, the length of the wire portion in a horizontal direction (X axis direction of FIG. 3), on which the IC chip connection parts 13a and 13b are not present, is set to 19 mm, and each of lengths of the wire portions in a vertical direction (Y axis direction of FIG. 3) is set to 19 mm. Moreover, the length of the wire portion in the horizontal direction, on which the IC chip connection part 13a is present, and the length of the wire portion in the horizontal direction, on which the IC chip connection part 13b is present, are set to 9 mm ((19-1)/2 mm). With such settings, the loop length of one circle of the second loop 12 is increased as long as possible within the scope of constraints placed by the size demanded for the loop antenna 10.

Moreover, the width of the slit 14 within the wires in the horizontal direction of the loop antenna 10 among the wire portions of the loop antenna 10 which respectively correspond to the sides of the loop antenna 10 is set to 0.5 mm by taking, into account, precision of the loop antenna 10 when being manufactured. Then, an interval between the slit 14 within the wire adjacent to the IC chip connection part 13a and the slit 14 within the wire adjacent to the IC chip connection part 13b is set to 5 mm. By setting the interval to 5 mm in this way, the length in the horizontal direction of the portion where the first loop 11 and the second loop 12 are merged is set to 2 mm ((5-1)/2 mm).

Then, the length of the wire in the horizontal direction of the first loop 11, on which the IC chip connection parts 13a and 13b are not present, among the wire portions of the first loop 11 which respectively correspond to the sides of the first loop 11, is set to 13 mm. Moreover, the length of the wire in the horizontal direction of the first loop 11, on which the IC chip connection part 13a is present, and the length of the wire in the horizontal direction of the first loop 11, on which the IC chip connection part 13b is present, are respectively set to 6 mm ((13-1)/2 mm). Next, each of widths of the wires in the horizontal direction of the first loop 11 is set to 1 mm.

Based on results of the settings made for the wires in the horizontal direction of the first loop 11, the width of the wire in the horizontal direction of the second loop 12, on which the IC chip connection part 13a is present, and the width of the wire in the horizontal direction of the second loop 12, on which the IC chip connection part 13b is present, are set as thick as possible within the scope of constraints. Namely, the widths of these wires are set to 2.5 mm ((19-13-0.5×2/2 mm) respectively.

Next, as illustrated in FIG. 3, each width of the slit 14 present within the wires in the horizontal direction of the loop antenna 10 is set to 0.5 mm by taking, into account, the precision of the loop antenna 10 when being manufactured.

In addition, each of the widths of the wires in the vertical direction of the first loop 11 is set to 1 mm. Similarly to the width of the wire in the horizontal direction of the second loop 12, on which the IC chip connection part 13a or 13b is present, each of the widths of the wires in the vertical direction of the second loop 12 is set to 2.5 mm.

Lastly, the lengths of the wires in the vertical direction of the first loop 11 are adjusted so that the inductance of the loop antenna 10, namely, the combined inductance of the inductor La1 and the inductor La2 when viewed from the side of the IC chip connection parts 13a and 13b results in 28 nH. Moreover, the width of the wire in the horizontal direction of the second loop 12, on which the IC chip connection parts 13a and 13b are not present, is adjusted.

Specifically, starting points of the wires in the vertical direction of the first loop 11 are respectively set at edges, which do not make contact with the second loop 12, among edges of the slit 14 within the wires in the horizontal direction of the loop antenna 10, which are adjacent to the IC chip connection parts 13a and 13b. Then, the lengths of the wires in the vertical direction of the first loop 11 are extended or contracted from the set starting points toward the wire in the horizontal direction of the first loop 11, on which the IC chip connection parts 13a and 13b are not present. Moreover, the width of the wire in the horizontal direction of the second loop 12, on which the IC chip connection parts 13a and 13b are not present, is increased as thick as possible according to the extended or contracted lengths of the wires in the vertical direction of the first loop 11.

As a result of the above described adjustments, the lengths of the wires in the vertical direction of the first loop 11 are set to 11 mm as illustrated in FIG. 3. Moreover, the width of the wire in the horizontal direction of the second loop 12, on which the IC chip connection parts 13a and 13b are not preset, is set to 4.5 mm ((19−11−0.5×2)−2.5 mm).

The sizes of the first loop 11 and the second loop 12 are set as described above, so that the first loop 11 is made to function as the portion for matching with the IC chip 20 and the second loop 12 is made to function as the portion for increasing the antenna gain in the embodiment. Note that the size of the loop antenna 10 and the size setting method, which have been described above with reference to FIG. 3, are merely examples, and are not particularly limited to these examples.

One example of a comparison made between the performance of the RFID tag including the loop antenna 10 according to the first embodiment and the performance of the RFID tag including the antenna according to the conventional technique is described below.

The shape and the size of the loop antenna 10 according to the first embodiment to be compared is the same as those described above with reference to FIG. 3. Moreover, a material of the loop antenna 10 is a conductor having a conductivity σ of 5×10⁶ S/m, and its thickness is 30 μm.

Figure 4:
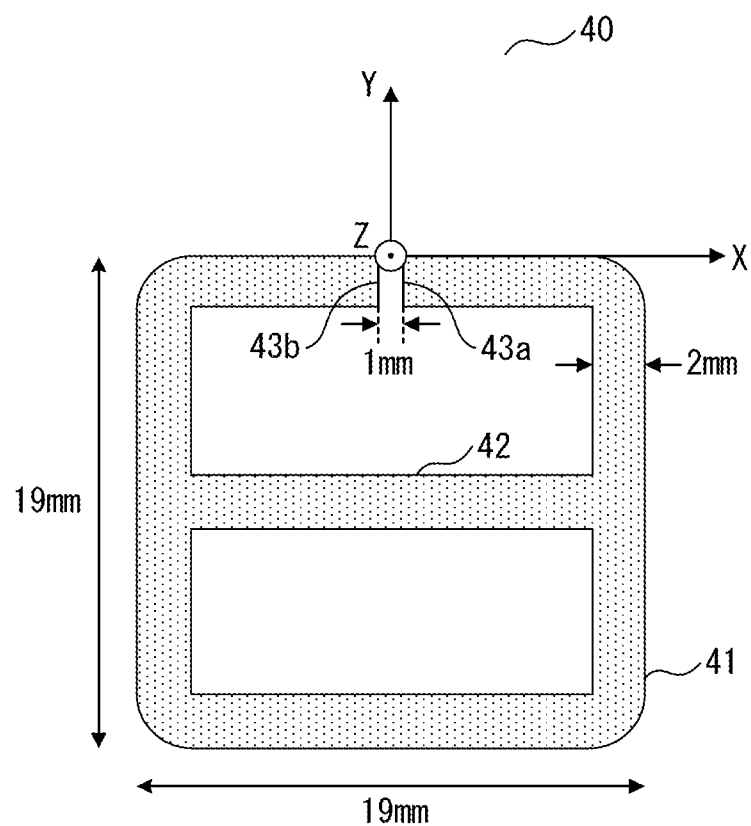
FIG. 4 illustrates a shape and a size of an antenna according to a conventional technique to be compared.

FIG. 4 illustrates the shape and the size of the antenna according to the conventional technique to be compared. As illustrated in FIG. 4, the antenna 40 according to the conventional technique to be compared includes IC chip connection parts 43a and 43b to which the IC chip 20 are connected, a loop part 41 that is connected to the IC chip connection parts and 43b and nearly takes the shape of a quadrangle, and a linear bypass conducting path 42 for bypassing the loop part 41. The bypass conducting path 42 is present at a position that divides the vertical direction (Y axis direction of FIG. 4) of the loop part 41 into halves.

The loop part 41 and the bypass conducting path 42 are conductors respectively having a conductivity σ of 5×10⁶ S/m, and their thicknesses are 30 μm. Moreover, a width of each of wires which respectively correspond to sides of the loop part 41 and a width of the bypass conducting path 42 are 2 mm. An interval between the IC chip connection part 43a and the IC chip connection part 43b is 1 mm.

A length of each of the wires of the loop part 41 is 19 mm except for the wires on which the IC chip connection parts 43a and 43b are present, and a length of the wire on which the IC chip connection part 43a is present and a length of the wire on which the IC chip connection part 43b is present are respectively 9 mm. Namely, a mounting area of the antenna 40 according to the conventional technique is the same as that of the loop antenna 10 according to the first embodiment to be compared. Moreover, a mounting area of the RFID tag including the antenna 40 is the same as that of the RFID tag including the loop antenna 10.

The RFID tag including the loop antenna 10 according to the above described first embodiment and the IC chip, and the RFID tag including the conventional antenna 40 and the IC chip 20 are analyzed by using an electromagnetic field simulation by assuming that an output and an antenna gain of the reader/writer are respectively 1 W (namely, 30 dBm) and 6 dBi, and minimum operating power $P_{mim}$ of the IC chip is −17 dBm. Results obtained by making a comparison between the performances of both the tags are described below with reference to FIGS. 5 to 9.

FIG. 5 illustrates frequency characteristics relative to communicable distances of the RFID tag including the loop antenna according to the first embodiment and the RFID tag including the conventional antenna.

As illustrated in FIG. 5, both the RFID tag including the loop antenna according to the first embodiment and the RFID tag including the conventional antenna satisfy the resonant condition at 953 MHz, so that their communicable distances with the reader/writer become longest.

However, at 953 MHz where the resonant condition is satisfied, the communicable distance of the RFID tag including the conventional antenna 40 is approximately 2 m, whereas that of the RFID tag including the loop antenna 10 according to the first embodiment is approximately 2.5 m as illustrated in FIG. 5. Accordingly, the communicable distance of the RFID tag including the loop antenna 10 according to the first embodiment can be extended by approximately 25 percent although the mounting area of the RFID tag including the loop antenna 10 according to the first embodiment is the same as that of the RFID tag including the conventional antenna 40.

Additionally, as illustrated in FIG. 5, the communicable distance of the RFID tag including the loop antenna 10 according to the first embodiment is extended at all frequencies ranging from 800 MHz to 1100 MHz to be measured as a result of the comparison made with the RFID tag including the conventional antenna 40. Accordingly, also at frequencies before and after 953 MHz where the resonant condition is satisfied, the communicable distance of the RFID tag including the loop antenna 10 according to the first embodiment can be extended although its mounting area is the same as that of the RFID tag including the conventional antenna 40.

FIG. 6 illustrates a current density distribution of the RFID tag including the loop antenna according to the first embodiment. FIG. 7 illustrates a current density distribution of the RFID tag including the conventional antenna.

With reference to FIG. 6, in the RFID tag including the loop antenna 10 according to the first embodiment, a current concentrates on the first loop 11 which is the loop portion on the inner side, and the first loop 11 functions as an inductor. Moreover, with reference to FIG. 7, in the RFID tag including the conventional antenna 40, a current concentrates on an inner side loop part 44 which is represented with a dotted line and includes the bypass conducting path 42, and the inner side loop part 44 functions as an inductor.

However, with reference to FIG. 7, a portion of a current path of the inner side loop part 44 and a portion of a current path of the loop part 41 are shared. Therefore, the current flowing into the loop part 41 having a loop length longer by one circle than the inner side loop part 44 is impeded by the current flowing into the inner side loop part 44. In contrast, with reference to FIG. 6, a current path of the second loop 12 which is a loop portion on the outer side is independent of the current path of the first loop 11 which is a loop portion on the inner side. Therefore, the current flowing into the second loop 12 is not impeded by the current flowing into the first loop 11.

As described above, the second loop 12 having a loop length longer by one circle than the first loop 11 can function as a portion for increasing the antenna gain within the loop antenna 10. Accordingly, since the current flowing into the second loop 12 for increasing an antenna gain flows smoothly without being impeded in the loop antenna 10 according to the first embodiment, the antenna gain can be increased in comparison with the conventional antenna 40.

Such an increase of the antenna gain can be also understood with reference to FIGS. 8 and 9.

FIG. 8 illustrates an antenna directivity of the RFID tag including the loop antenna according to the first embodiment. FIG. 9 illustrates an antenna directivity of the RFID tag including the conventional antenna.

With reference to FIGS. 8 and 9, it is proved that the antenna gain of the RFID tag including the loop antenna 10 according to the first embodiment increases by approximately 1.7 dB in comparison with the RFID tag including the conventional antenna 40 at any angle on a ZX plane and a YZ plane of coordinate axes illustrated in FIGS. 3 and 4.

Accordingly, as is proved from the above provided description with reference to FIGS. 5 to 9, using the loop antenna 10 according to the first embodiment for an RFID tag enables a communicable distance with a reader/writer to be extended while downsizing the RFID tag.

In addition, using the loop antenna 10 according to the first embodiment for an RFID tag enables a communication with a reader/writer to be implemented in a communication distance similar to that of the RFID tag including the conventional antenna even though a transmission output of the reader/writer is suppressed. Accordingly, the RFID tag including the loop antenna 10 is suitable for use in an environment where suppression of unneeded electromagnetic waves is demanded, such as a hospital.

Figure 10:
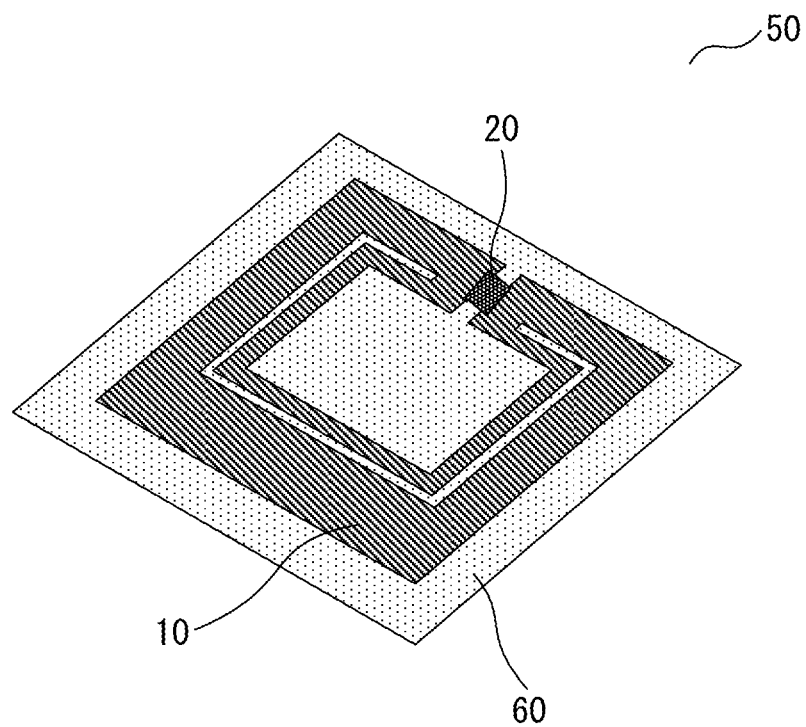
FIG. 10 illustrates an example of a configuration of an RFID tag according to the embodiment which includes a tag base.

FIG. 10 illustrates an example of a configuration of the RFID tag according to the embodiment, which includes a tag base. FIG. 11 is an explanatory diagram of a usage example of the RFID tag according to the embodiment.

As illustrated in FIG. 10, in the RFID tag 50 according to the embodiment, an antenna pattern of the loop antenna 10 can be formed on a tag base 60 in the form of a sheet, and the IC chip 20 can be mounted on the IC chip connection parts 13a and 13b. The tag base 60 can be, for example, polyethylene terephthalate (PET) or paper. The loop antenna 10 can be formed by etching a silver (AG) paste, copper (Cu), and aluminum (Al).

The RFID tag 50 according to the embodiment, which is formed as illustrated in FIG. 10, can be, for example, pasted onto a cylinder target object 70 as illustrated in FIG. 11. The target object 70 illustrated in FIG. 11 is, for example, a sample container that contains a liquid or the like.

With reference to FIG. 8, it is proved that the loop antenna 10 according to the first embodiment has the maximum antenna gain when an angle from the Z axis is 90 degrees or −90 degrees in the Y axis direction. Moreover, it is proved that the loop antenna 10 according to the first embodiment has the maximum antenna gain when an angle from the Z axis is 90 degrees or −90 degrees in the X axis direction. Accordingly, the RFID tag 50 according to the first embodiment, which includes the loop antenna 10, has an advantage of being insusceptible to influences exerted by the target object 70 because the RFID tag 50 has a constant directivity in its planar direction and has a null point in the vertical direction. In addition, the RFID tag 50 according to the embodiment has an advantage of being attachable to the target object 70 which contains a liquid having a high permittivity, such as a sample container.

Second Embodiment

As illustrated in FIG. 1, the first loop 11 and the second loop 12 within the loop antenna 10 according to the first embodiment take the shape of a quadrangle such as a square or a rectangle except for the IC chip connection parts 13a and 13b. However, the shapes of the first loop and the second loop of the loop antenna according to the embodiment are not limited to a quadrangle.

Figure 12:
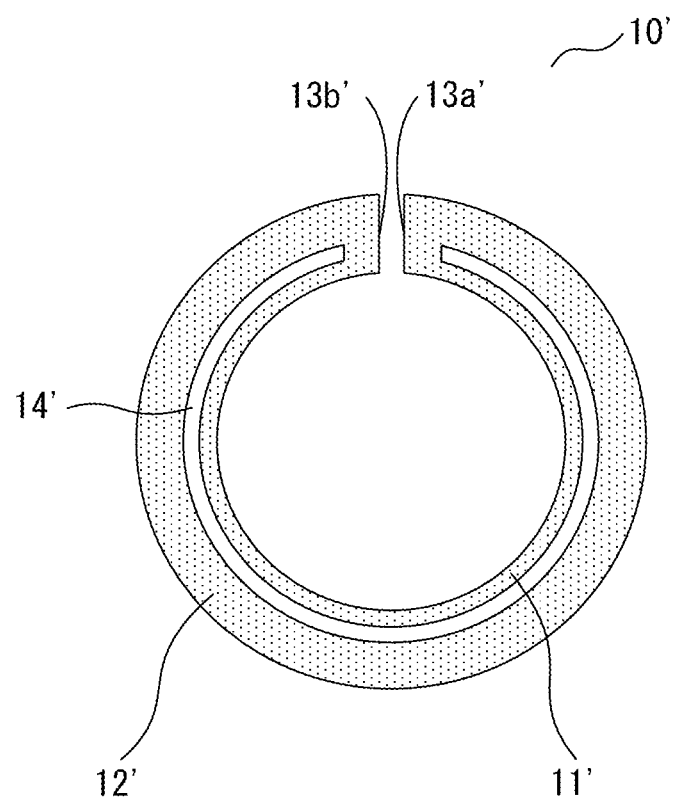
FIG. 12 schematically illustrates a configuration of a loop antenna according to a second embodiment.

FIG. 12 schematically illustrates a configuration of a loop antenna according to a second embodiment.

As illustrated in FIG. 12, the loop antenna 10' according to the second embodiment includes a first loop 11', a second loop 12', IC chip connection parts 13a' and 13b', and a slit 14'.

In the second embodiment, the first loop 11' and the second loop 12' take the shape of a circle except for the IC chip connection parts 13a' and 13b' that are separately present.

The first loop 11' is a loop portion on an inners side in the loop antenna 10', whereas the second loop 12' is a loop portion on an outer side in the loop antenna 10'. The first loop 11' is present on an inner side of the second loop 12', and the second loop 12' encloses the outer side of the first loop 11'. With the first loop 11' and the second loop 12', the loop antenna 10' is configured as a double-loop antenna.

The first loop 11' and the second loop 12' are separated by the slit 14', and merged at the IC chip connection parts 13a and 13b which are positioned at ends of the first loop 11' and the second loop 12'.

Similarly to the above described loop antenna 10 according to the first embodiment, the first loop 11' and the second loop 12' are very small loops having a loop length that is sufficiently shorter than a wavelength corresponding to a desired frequency.

In addition, similarly to the loop antenna 10 according to the above described first embodiment, the first loop 11' can function as a portion for matching with an IC chip connected to the loop antenna 10'. The second loop 12' can function as a portion for increasing an antenna gain within the loop antenna 10'. Accordingly, the loop antenna 10' can increase the antenna gain in comparison with a conventional antenna due to reasons similar to those of the loop antenna 10 described above with reference to FIG. 7.

Therefore, using the loop antenna 10' according to the second embodiment for an RFID tag enables a communicable distance with a reader/writer to be extended while downsizing the RFID tag.

In addition, using the loop antenna 10' according to the second embodiment for an RFID tag enables a communication with a reader/writer to be implemented in a communication distance similar to that of an RFID tag including a conventional antenna even though a transmission output of the reader/writer is suppressed.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An antenna comprising:
   a first loop;
   a second loop which encloses an outer side of the first loop and is separated from the first loop by a slit, and both ends of which are merged with both ends of the first loop; and
   IC chip connection parts provided in a portion where the first loop and the second loop are merged, wherein
   a mounting area of the antenna is equal to a mounting area of the second loop;
   a loop length of the first loop and a loop length of the second loop are equal to or shorter than one third of a wavelength corresponding to a desired frequency resonant with an IC chip connected to the IC chip connection parts,
   an inductance of the first loop and a capacitance of the IC chip are resonant at the desired frequency,
   a wire length of the second loop is formed in accordance with a size demanded for the antenna, and
   the wire width of the second loop is formed to be thicker than a wire width of the first loop in accordance with a size of the first loop resonant at the desired frequency and a predetermined width of the slit.

2. The antenna according to claim 1, wherein
   the first loop and the second loop take the shape of a quadrangle.

3. An RFID tag comprising:
   an IC chip; and
   an antenna connected to the IC chip, the antenna including
     a first loop, and
     a second loop which encloses an outer side of the first loop and is separated from the first loop by a slit, and both ends of which are merged with both ends of the first loop, and
     IC chip connection parts provided in a portion where the first loop and the second loop are merged, wherein a mounting area of the antenna is equal to a mounting area of the second loop;

a loop length of the first loop and a loop length of the second loop are equal to or shorter than one third of a wavelength corresponding to a desired frequency resonant with an IC chip connected to the IC chip connection parts, an inductance of the first loop and a capacitance of the IC chip are resonant at the desired frequency, a wire length of the second loop is formed in accordance with a size demanded for the antenna, and the wire width of the second loop is formed to be thicker than a wire width of the first loop in accordance with a size of the first loop resonant at the desired frequency and a predetermined width of the slit.

4. The RFID tag according to claim 3, wherein the first loop and the second loop take the shape of a quadrangle.

5. The RFID tag according to claim 3, further comprising a tag base, wherein an antenna pattern of the antenna is formed on the tag base.

* * * * *